(12) United States Patent
Ahlsten

(10) Patent No.: US 6,854,147 B1
(45) Date of Patent: Feb. 15, 2005

(54) LOADING RAMP APPARATUS

(76) Inventor: George E. Ahlsten, 304 4th St. N., Wheaton, MN (US) 56296

( * ) Notice: Subject to any disclaimer, the term of this patent is extended or adjusted under 35 U.S.C. 154(b) by 0 days.

(21) Appl. No.: 10/117,966

(22) Filed: Apr. 5, 2002

(51) Int. Cl.[7] .............................. B64C 1/22; B64D 9/00; B60P 1/02
(52) U.S. Cl. ........................ 14/69.5; 414/495; 414/522; 414/398; 296/20
(58) Field of Search ............................ 296/20; 14/69.5, 14/71.1, 71.3, 71.5; 414/398, 430, 495, 529, 522, 595

(56) References Cited

U.S. PATENT DOCUMENTS

| | | | | |
|---|---|---|---|---|
| 2,327,680 A | * | 8/1943 | Tavaris | 414/522 |
| 2,400,939 A | * | 5/1946 | Martin | 414/595 |
| 2,482,211 A | * | 9/1949 | Hendricus | 187/231 |
| 2,702,095 A | * | 2/1955 | Kelly | 187/241 |
| 3,799,479 A | * | 3/1974 | Roeder et al. | 244/137.1 |
| 3,833,138 A | * | 9/1974 | Dean | 414/430 |
| 4,068,770 A | * | 1/1978 | Boehringer | 414/537 |
| 4,165,810 A | * | 8/1979 | Young | 414/595 |
| 4,186,901 A | * | 2/1980 | Shorey | 244/137.1 |
| 4,235,399 A | * | 11/1980 | Shorey | 244/137.1 |
| 4,249,848 A | * | 2/1981 | Griffin et al. | 414/332 |
| 4,304,518 A | * | 12/1981 | Carder et al. | 414/495 |
| 4,345,669 A | * | 8/1982 | Noall | 187/201 |
| 4,528,711 A | * | 7/1985 | Packer | 14/69.5 |
| 4,669,574 A | * | 6/1987 | Moutot | 182/88 |
| 4,671,730 A | * | 6/1987 | Gateau | 414/495 |
| 5,140,716 A | * | 8/1992 | Rawdon et al. | 14/71.1 |
| 5,253,973 A | * | 10/1993 | Fretwell | 414/558 |
| 5,481,770 A | * | 1/1996 | Ahlsten | 5/625 |
| 5,499,419 A | * | 3/1996 | Baranowski | 14/69.5 |
| 5,535,964 A | * | 7/1996 | Ahlsten | 244/118.5 |
| 6,024,528 A | * | 2/2000 | Taylor | 414/495 |
| 6,109,854 A | * | 8/2000 | Thompson et al. | 414/398 |

FOREIGN PATENT DOCUMENTS

| | | | | |
|---|---|---|---|---|
| DE | 1556282 | * | 10/1967 | B66F/7/00 |
| DE | 19757025 | * | 7/1999 | B64D/9/00 |
| EP | 644113 | * | 9/1994 | B64C/1/22 |
| WO | WO 200200466 A | * | 6/2001 | B60P/1/38 |

* cited by examiner

Primary Examiner—Robert E. Pezzuto
Assistant Examiner—Alexandra K. Pechhold
(74) Attorney, Agent, or Firm—Robert E. Kleve

(57) ABSTRACT

A loading ramp having an elongated frame with guideways along its length on opposite side thereof. A moving panel having rollers at its front and rear adapted to roll along die guideways of the ramp to roll the panel along the length of the elongated frame. A table mounted at one end to the moving panel and support means to support the table at its other end out away from the panel. A loading bracket for mounting in the doorway of an aircraft and adapted to receive the upper end of the elongated frame to provide a ramp from the ground to the doorway of the aircraft. A power mechanism for powering the panel and connecting table upward and downward along the frame from adjacent the ground to the doorway of the aircraft. The supporting members of the table acting to support the outer end of the table approximately away from the ramp and approximately horizontal as the power mechanism powers the table and panel upward and downward on the ramp to enable a stretcher to be placed on the table and raised from the ground into the doorway of the aircraft while approximately horizontal to the ground.

3 Claims, 6 Drawing Sheets

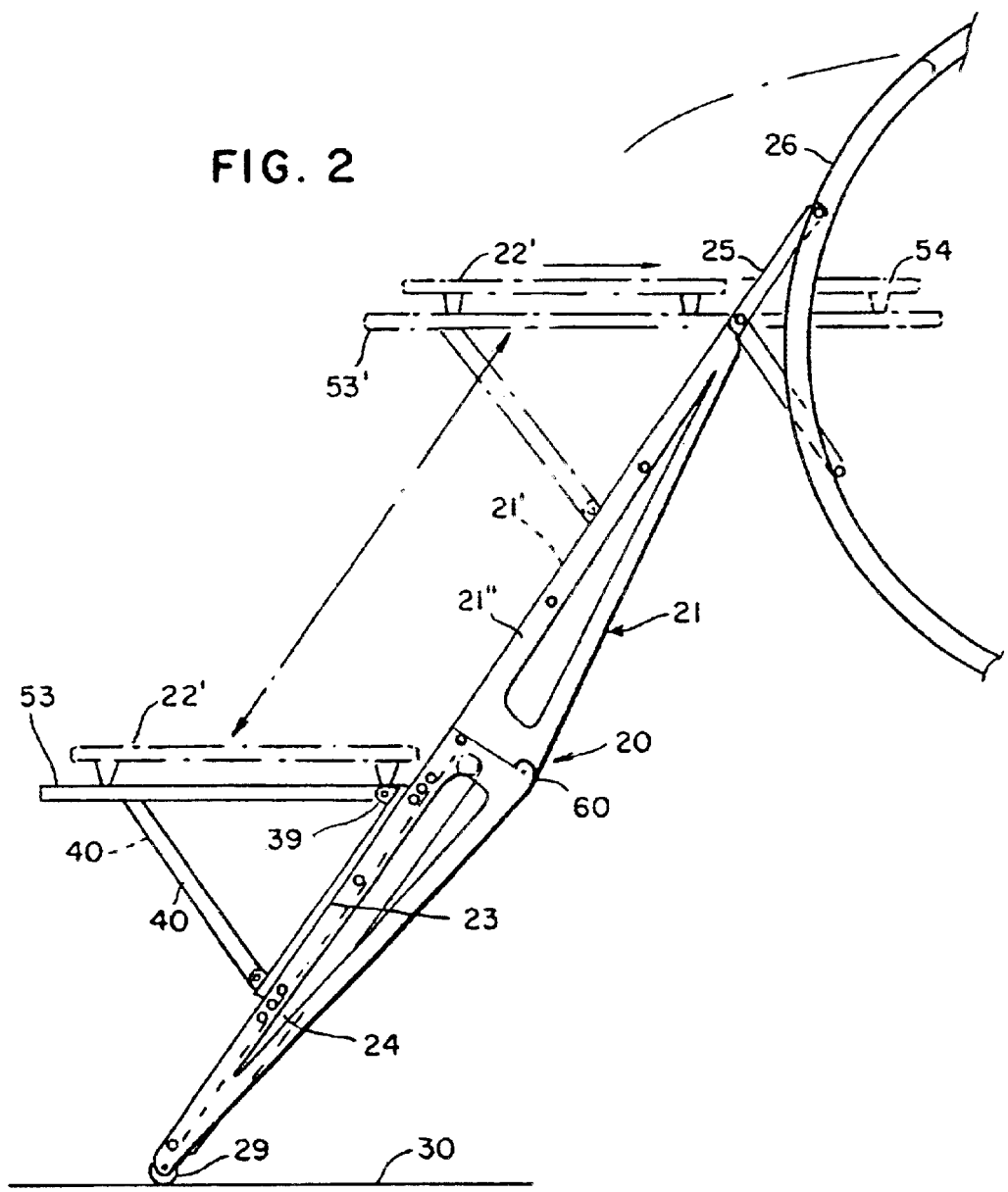

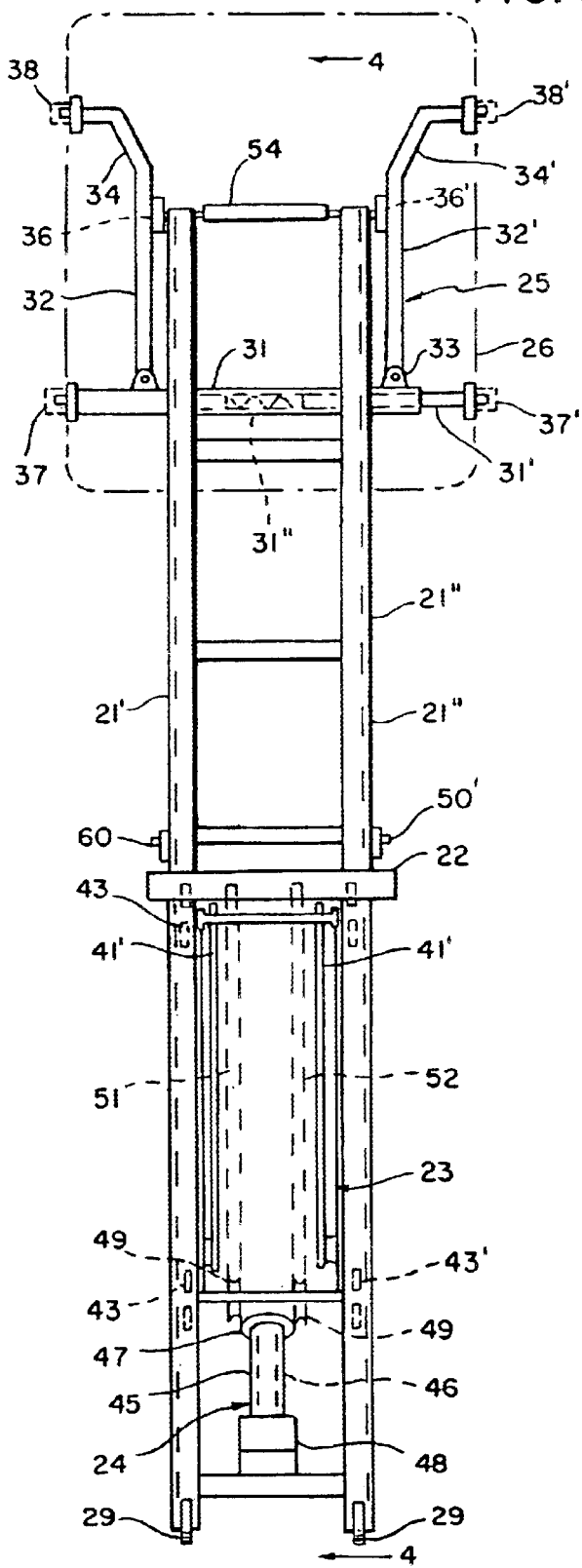
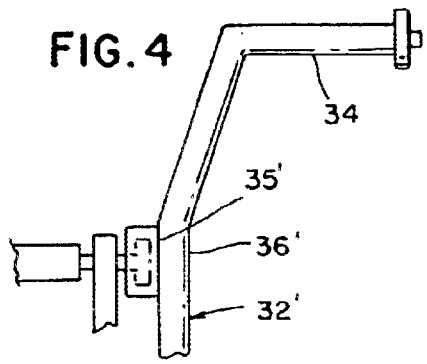
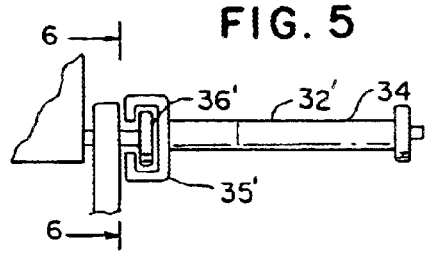
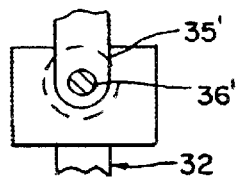

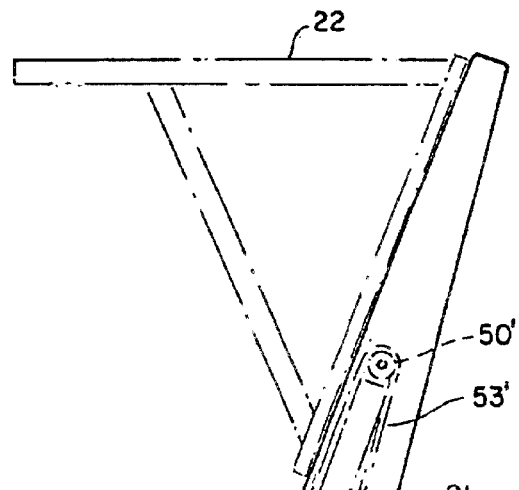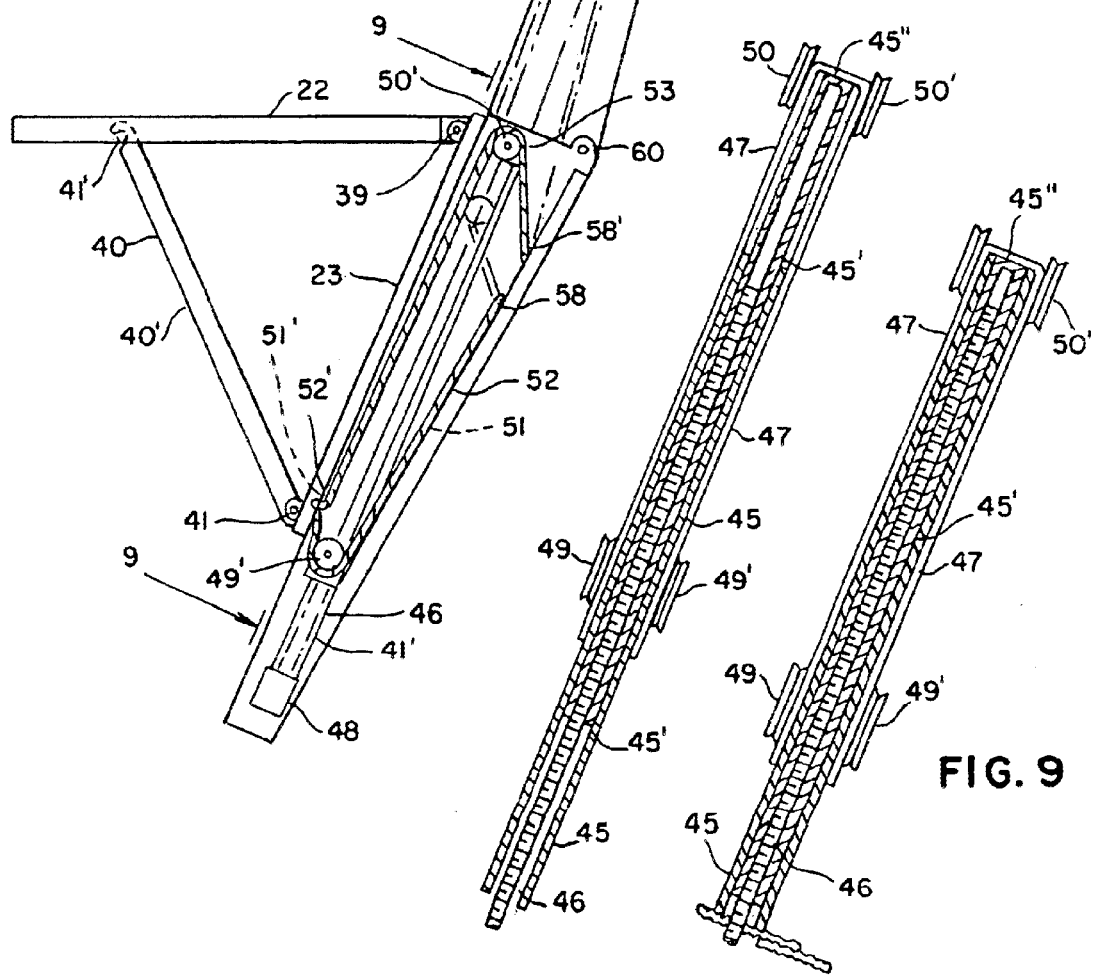

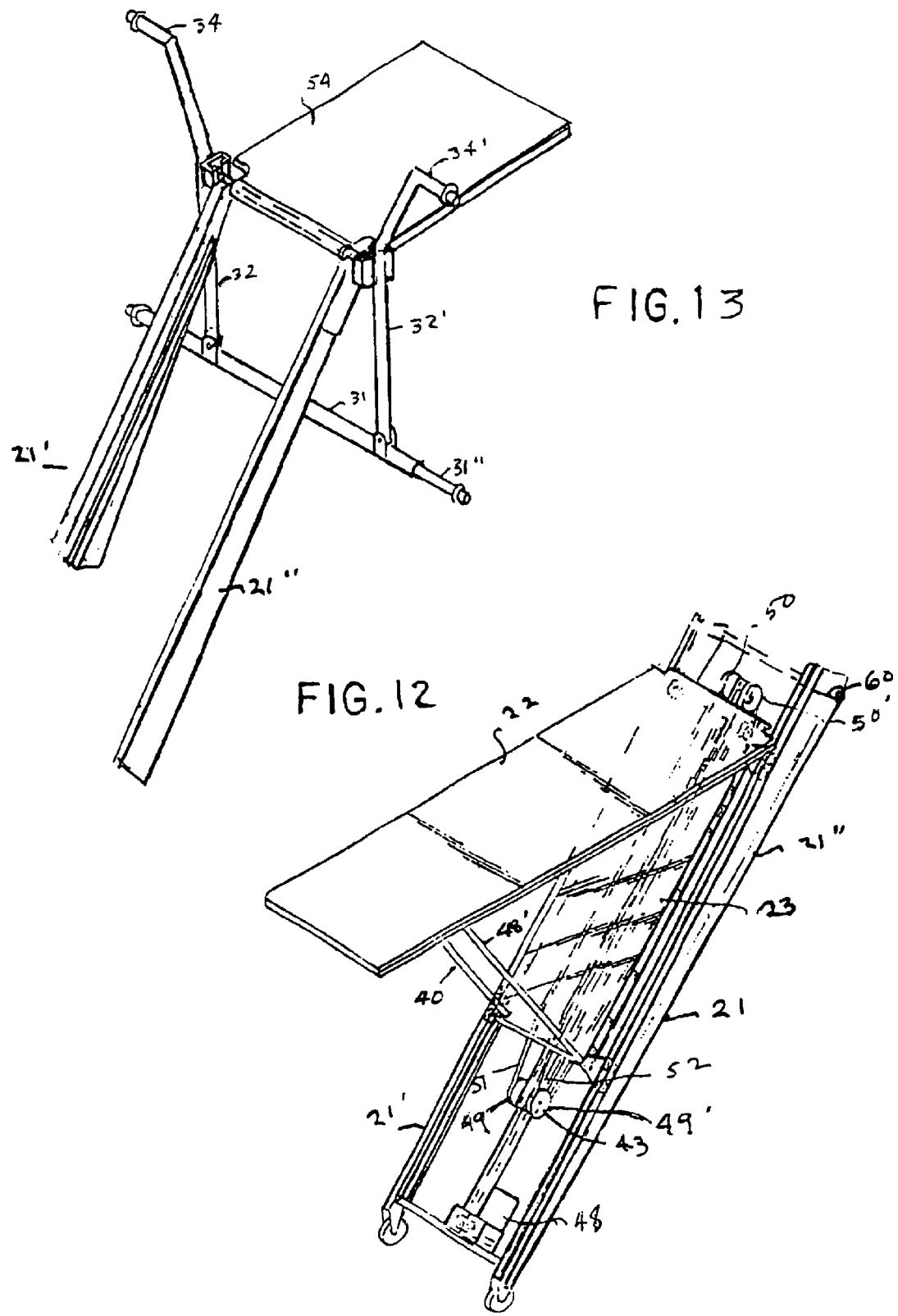

LOADING RAMP APPARATUS

This invention relates to loading ramps for loading patients into an aircraft.

It is an object of the invention to provide a novel ramp with power operated table to power the table with a stretcher thereon up the ramp in the doorway of an aircraft.

It is a further object of the invention to provide a novel patient ramp which can be located with its lower end on the ground and its upper end in the open doorway of an aircraft with an elongated frame with power means to power a table up the ramp to move a stretcher up the ramp to the doorway.

It is another object of the invention to provide a novel ramp to power a table up the ramp to the doorway of an aircraft with the table substantially horizontal and capable of supporting a stretcher with a patient thereon to move the patient from the ground to the doorway of the aircraft.

Further objects and advantages of the invention will become apparent as the description proceeds and when taken in conjunction with the accompanying drawings wherein.

BRIEF DESCRIPTION OF THE DRAWINGS

FIG. 2 is a side elevational view of the loading ramp invention shown installed in a doorway of an aircraft.

FIG. 3 is a front elevational view of the loading ramp invention shown installed in a doorway of an aircraft.

FIG. 4 is an enlarged fragmentary side view of detachable connection between the ramp and the loading frame for attachment of the ramp to the doorway.

FIG. 5 is an enlarged fragmentary top view of the detachable connection.

FIG. 6 is a cross sectional view taken along line 6—6 of FIG. 5.

FIG. 7 is an enlarged side elevational view of the loading ramp invention taken along line 7—7 of FIG. 3, illustrating the power mechanism for powering the table up and down the ramp.

FIG. 8 is a further enlarged cross sectional view of the power mechanism for powering the table along the ramp taken along line 8—8 of FIG. 7, with the telescoping sleeve of the power mechanism partially telescoped.

FIG. 9 is a side view similar to FIG. 8, with the telescoping sleeve retracted.

FIG. 12 is an enlarged perspective view of the lower portion of the loading ramp.

FIG. 13 is an enlarged perspective view of the loading bracket illustrating the lug and slot connection between the loading bracket and the upper end of the ramp.

Figure 1:
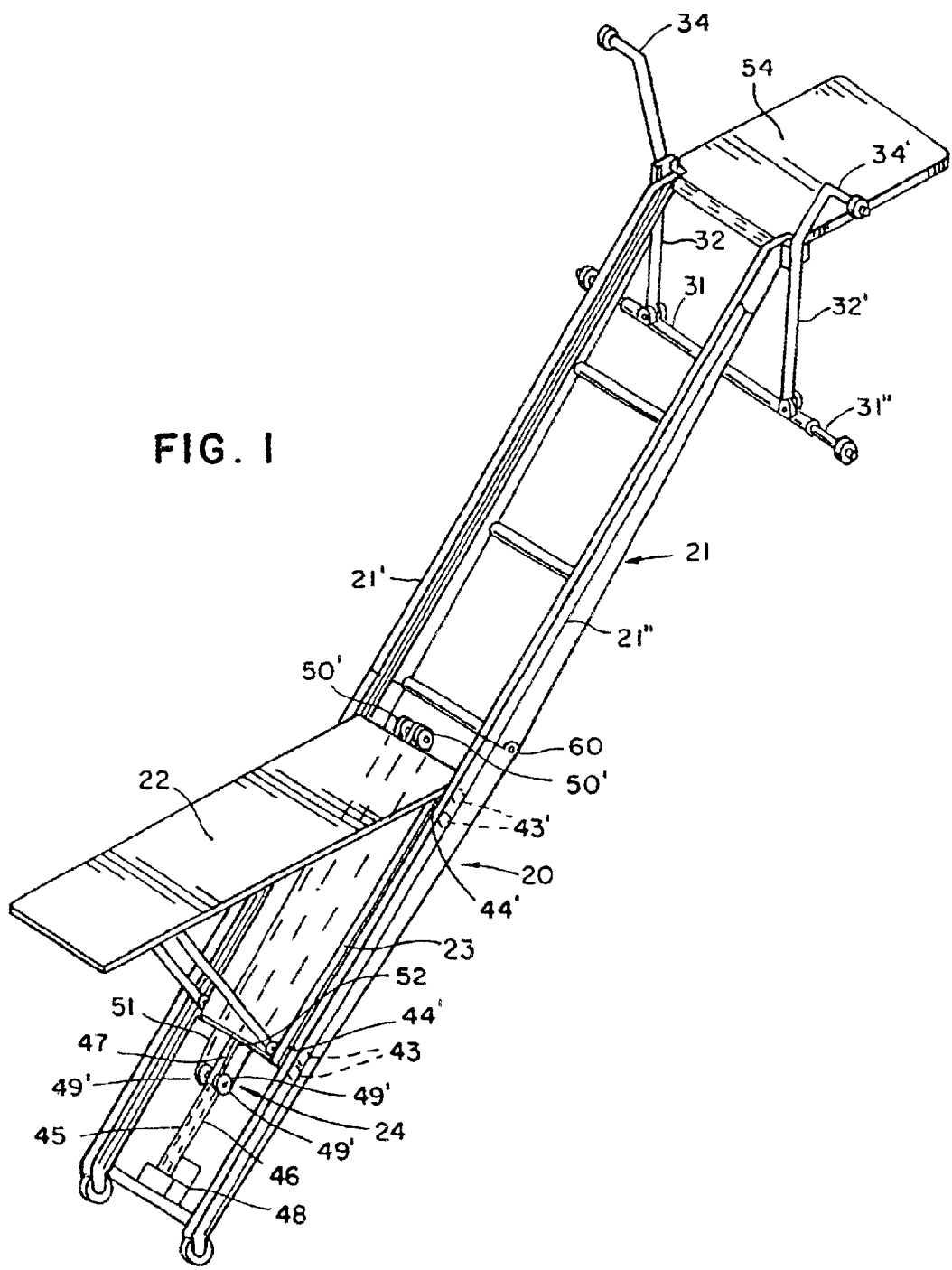
FIG. 1 is a perspective view of the loading ramp invention.
Figure 11:
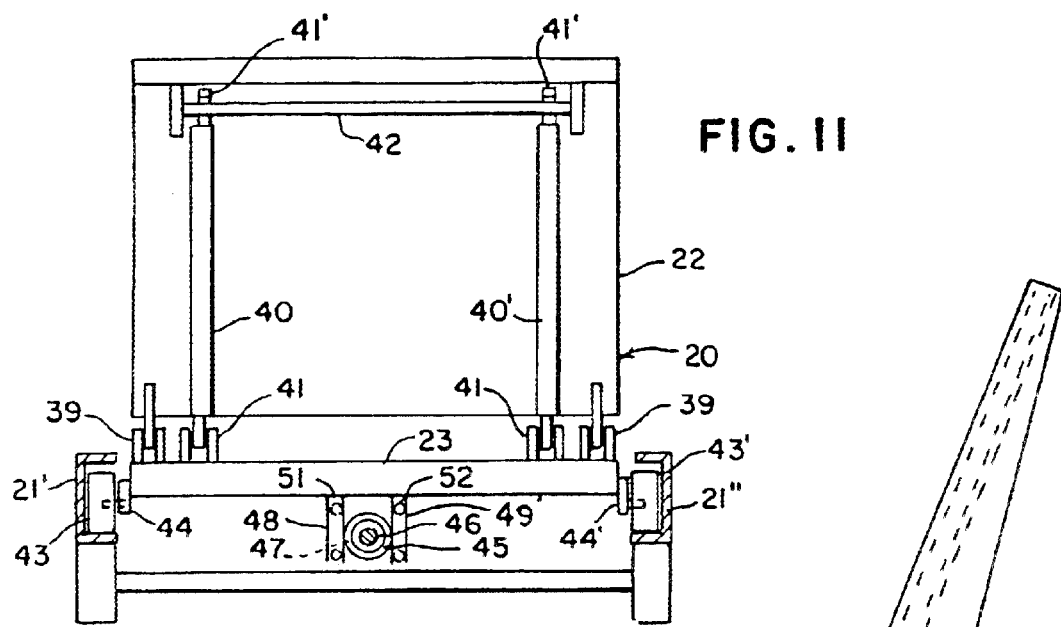
FIG. 11 is a cross sectional view taken along line 11—11 of FIG 10.
Figure 10:
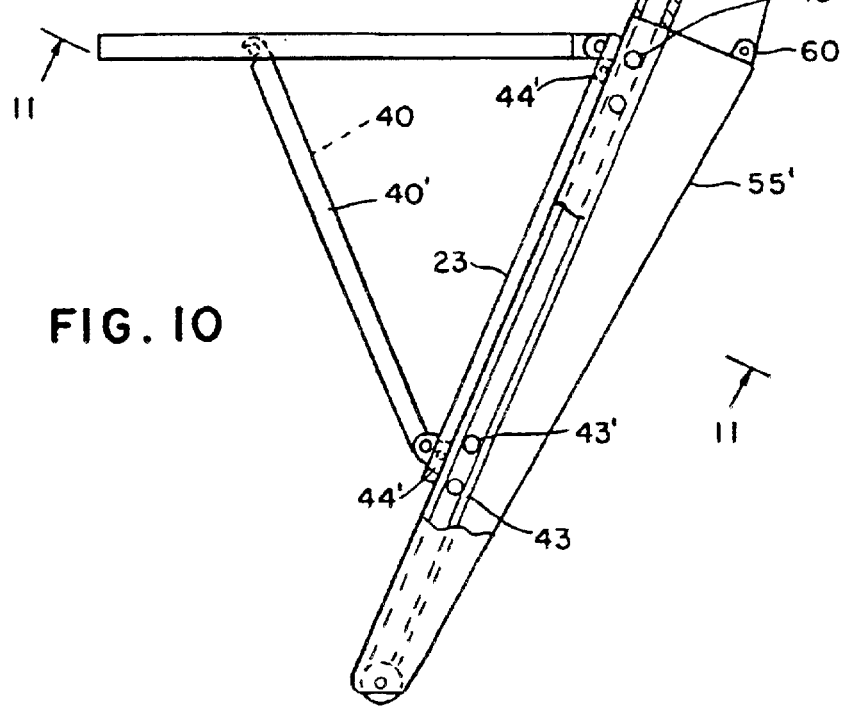
FIG. 10 is a side elevational view of the loading ramp with portions cutaway along the guideway.

BRIEF DESCRIPTION OF PREFERRED EMBODIMENT OF THE INVENTION:

Briefly stated, the invention comprises loading ramp device for loading a patient, while on a stretcher, from the ground to an open doorway of an aircraft, and while the aircraft is parsed on the ground will its carriage or wheels spacing the body of the aircraft above the ground, comprising a elongated frame adapted to be inclined upward to have its lower end rest on the ground and its upper end positioned and secured adjacent the open doorway. A support panel is mounted on wheels rolling in guideways along the length of the frame enabling the panel to move in the guideways upward along the length of the frame. Power means are provided to power the movement of the support panel and a table is mounted to the support panel to move with the support panel upward along the guideways, while remaining in approximately a horizontal position relative to the inclined ramp, so that a patient on a stretcher may be placed on the table and powered upward on the ramp to the top of the ramp and to the doorway while remaining in a generally horizontal position.

The patient loading apparatus 20 has a main guideway frame or ramp 21 with a pair of C shaped parallel channels 21' and 21" forming guideways along the main frame. A stretcher table 22 is pivotally mounted on a panel 23 and the panel 23 is slidably mounted in the c shaped guideways 21' and 21" of the ramp. A power mechanism 24 is mounted to the ramp to power the panel 23 upward and downward on die ramp to thereby power the stretcher table 22 upward and downward on the ramp.

A load attachment frame 25 is mounted to the upper end of the ramp 21 to attach the upper end $_{21}$'" of the ramp to the open doorway 26 of an aircraft 27, while the lower end of the ramp is resting on wheels 29 on the ground 30.

The loading frame 25 is adapted to be removably mounted to the upper end of the ramp 21. The loading frame 25 has a lower horizontal cross frame member 31. A pair of extending upward shaft members 32 and 32' have their lower ends 33 pivotally mounted to the lower cross frame member 31 with their upper lateral ends 34 and 34 extending laterally outward away from one another. The upward extending shaft members 32 and 32' each also have mounting slot members 35 and 35' fixed to the shaft members intermediate their heights.

The channel members 21' and 21" of the ramp 21 each have lugs 36 and 36' fixed to the upper end of the ramp, which project outward from the channels and are slideable vertically into the, slots 35 and 35' respectively of the shaft members 32 and 32' of the load attachment frame 25 to lock the ramp to the loading frame after the loading frame has been installed in the open doorway of the aircraft.

The lower cross brace member 31 of the loading frame 25 is a elongated hollow rod with a telescoping outer rod member 31' which is spring urged outward to project partially outward from the one end of the rod member 31 by a spring 31". The spring urges the telescoping rod member 31' to protect the outer end outward from the outer end of the brace member 31. The operator may, push (the end of telescoping rod member 31' inward enough to allow the cross member to be aligned with its ends axially with the holes 37 and 37' on opposite sides of the doorway and insert the outer end of brace member 31 into the lower hole 37 and then release the ends so that the spring will telescope the outer end rod member 31' into the hole 37' to attach the lower outer rod members to the pair of holes 37 and 37' on opposite side of the doorway 26 of the aircraft, whereby partially attaching the loading frame 25 to the doorway.

Installation of loading frame and ramp to the aircraft:

The loading frame is initially installed in the doorway before installing the ramp.

The shaft members 32 and 32' of the loading frame, which are pivotally mounted at their lower ends to the cross frame, are initially pivoted inward toward one another from their position in FIG. 3, to place their ends at 3 length less than the width of the doorway, to allow the lateral ends of the lower cross member 31 to be aligned with the lower holes 37 and 37' of the doorway. The operator then will manually compress the lateral telescoping rod 31' at its outer end of the cross frame member sufficiently to axially align the rods with the lower holes 37 and 37' in the doorway and then releasing the telescoping rods to allow them to telescope into the lower holes 37 and 37'. The shaft members 32 and 32' will then be pivoted outward to cause their lateral ends 34 and 34' to be inserted into the upper holes 38 and 38' of the doorway 26. Once the loading flame 25 has been installed in the doorway, the ramp can be installed to the loading frame. These holes are conventional in many aircraft and are used to lock the door in the doorway.

In this instance the holes are used to lock the loading bracket to the doorway of the aircraft and also lock ramp to the aircraft, by the ramp being locked to the loading bracket. These holes are used to install the loading bracket and ramp in the doorway when the door on the aircraft is open. The dimensions of the loading bracket may vary depending upon the type of aircraft being used with the loading ramp device.

Operation of the Ramp:

Once the loading bracket has been installed in the doorway and the ramp attached to the loading bracket, the ramp is operative to transport a stretcher with a patient thereon from the ground, up on the ramp to the doorway of the aircraft, where the stretcher and patient may unloaded and moved further into the aircraft to a proper location on the aircraft for flying on the aircraft.

The stretcher table 22 is mounted to the panel 23 on the ramp 21 and mosses up and down on the ramp with the panel 23. The forward end 39 of the table is pivotally mounted directly on to the panel 23. The table has a pair of rear legs 40 and 40' at the rear of the table, which are pivotally mounted at their lower ends to the panel 23 at pivots 41 and have hooks 41' at their upper ends which arc hooks to a rod 42 fixed to the underside of the table to thereby lock the table is a fixed position as shown in solid lines in FIG. 3 with the table extending horizontally away from the inclined ramp and panel in its operative position, and locked in this lateral operative position on the panel of the ramp.

The panel 23 on the ramp 21 has a pair of rollers 43 and 43' rotatably mounted to brackets 44 and 44' on each side of the front and rear of the panel 23 to provide a front and rear roiling support for the panel 23 in the guideways 21' and 21" of the ramp. The rollers 43 and 43' are slightly smaller in outside diameter to the inside diameter of the C shaped channels and are adapted to roll in the channels to provide a rolling support for the front and rear of the panel 23 to enable the panel to roller along the channels of the ramp. The table 22 has the pair of brackets 44 fixed to its forward end which brackets a pivotally mounted to the upper forward end of the panel 23, and the forward rollers of the panel are rotatable mounted to brackets 44' are adapted to roll in the C shaped channels adjacent the upper end of the table to provide a rolling support for the upper and lower ends of the table in the C shaped channels or guideways of the the ramp.

The power mechanism 24 has a stationary cylindrical sleeve 45 with a screw 46 power driven to rotate and auger an adjacent sleeve 45' to auger the inner sleeve 45' upward and downward in the the stationary sleeve, the adjacent sleeve having complementary threading and sliceable longitudinally, but non rotatable. An outer sleeve 47 is also slidably mounted over the stationary sleeve 45 and adjacent sleeve 45', but non rotatable. The rotation of the screw 45 augers the sleeve 45' upward and downward with the upper end 45" of the sleeve 45' engaging against the outer sleeve 47 to push and poster the outer sleeve 47 upward and downward. An electric motor 48 is mounted to the bottom of the bottom section of the ramp and has an output gear not shown engaging the screw member 46 to rotate the screw member axially in either selected direction of rotation to cause the panel member and table to go either up or down the ramp.

A pair of pulleys 49 and 49' are mounted to each side of the outer sleeve 47 at the rear of the sleeve and pulleys 50 and 50' are mounted to each side of the outer sleeve 47 at the front of the sleeve. A cable 51 has its ends fixed to the frame 21 at locations 58 and 58' and extends around the pulleys 49 and 50 on the sleeve 47 with an intermediate point 51' on the cable fisted to the panel 23 at a rear point on the panel 23. Similarly, a cable 52 has its ends fixed to the frame at locations 58 and 58' and extends about pulleys 49' and 50' on sleeve 47 with an intermediate point 52' on the cable fixed to the panel at a rear point on the panel.

Consequently, when the screw 46 on the ramp augers the inner sleeve 45' forward on the stationary sleeve 45; the forward end 45" of the inner sleeve 45' pushes the outer sleeve 47 forward on the ramp 21. The moment of the outer sleeve forward on the ramp pushes the cables 51 and 52 forward, while their ends remain fixed to the frame of the panel as the pulleys move forward. Since the cables 51 and 52 are also attached to the panel 23 at their intermediate point, the movement of the cables forward also moves the panel 23 forward on the outer sleeve.

The forward movement of the cables on the pulleys, as the pulleys move forward, acts to move the panel 23 forward on the ramp approximately twice the distance of the movement of the screw forward on the ramp, as shown in FIG. 7, and rearward, the cable by extending about the pulleys on the panel act to double the movement of the panel 23% with respect to the movement of the screw so as to move the panel double the length of movement of the screw. In other words, the panel 23 moves forward approximately its length, as seen in phantom lines in FIG. 7, as well as moving forward the length of the movement of the sleeve 45'. This enables the panel and table 22 to move approximately, twice the distance of the screw which is adequate to move the table 22 with the stretcher 22' thereon and a patient on the stretcher from near the ground to up to the middle of the doorway.

This movement is illustrated in FIG. 7, with the panel table, cables and outer sleeve and screw shown in solid lines at their lower position and indicated by numeral 53, and illustrated in their elevated position in phantom lines and designated by numeral 53'. This moves the stretcher 22' an adequate distance on the ramp so that the panel 23 and the stretcher table move substantially the fall length of the ramp to movement the stretcher table and any stretcher 22' on the table easily from near the ground to fully up to above the level of the doorway 26 of the aircraft as shown in the drawings. Once the table and stretcher have reached their upper position at the top of the ramp as shown in phantom lines in FIG. 2, the stretcher can be slid forward through the doorway into the aircraft sliding on the panel 54 of the loading bracket which panel is already positioned or located inside the aircraft by the doorway.

When the ramp 21 is not in use it may be folded together for storage, it having an upper section 55 and a lower section 55'pivotally connected at pivot point 60 so that when the upper section is pivoted counterclockwise relative to the lower section for use as shown in FIG. 1, the sections will lock when parallel to one another in end to end relation. The sections, however, will pivot together in a clockwise direction when not in use, so they maybe folded together at its middle pivotal connection 60 to a more compact shape and legs of the table may be unlocked and pivoted parallel to the section., and the table folded into substantial, parallel position to the ramp sections to provide compact shape to the ramp for easier storage.

The hooks 41' at the upper ends of the rear legs of the table can be unhooked from the table and folded parallel to the panel, with the table also pivoted or folded down parallel to the panel and ramp for the storage.

The loading may be detached from the ramp and from the doorway, and the ramp, table and loading bracket may be stored easily inside the aircraft thorough the doorway until they are needed again.

The ramp, panel table and power mechanism of the invention may used in the reverse to lower the stretcher down to the ground out of the aircraft, when the aircraft has reached its destination, and it is desired to remove the patient on the stretcher from the aircraft.

It will be obvious that various changes and departures may be made to the invention without departing from the spirit and scope thereof and accordingly, it is not intended that the invention be limited to that specifically described bed in the specification or as illustrated in the drawing but only as set forth in the appended claims wherein:

What is claimed is:

1. An inclined loading ramp apparatus for loading a stretcher onto an aircraft while the aircraft is located on the ground and wherein the aircraft fuselage has an opening in its side forming a doorway spaced above the ground for receiving a stretcher with the doorway having a top and bottom edge with opposing side edges defining the doorway;

said apparatus comprising a first lower and second upper elongated channel member each having upper and lower ends with the upper end of the first lower channel member pivotally mounted to the lower end of the second upper channel member, and with the channels adapted to be pivoted to end to end straight line relationship for use and foldable about said pivot to substantially parallelism for storage;

a loading frame having a cross brace member a pair of elongated bar members pivotally mounted at their lower ends to the cross brace member, the bar members having upper outward projecting pins at their upper ends and with a lower telescoping pin means spring urged to extend outward in the cross brace member, with the upper and lower pins adapted to engage the side edges of the doorway;

each of said elongated bar members of the loading frame having receiving slots, said upper channel member of the ramp apparatus having lugs on opposite sides for slidably mounting in the slots of the loading frame with the upper channel member of the ramp apparatus between the elongated bar members of the loading frame and with the pins of the bars of the loading frame mounted in the doorway, with the upper and lower channels of the ramp apparatus adapted to incline downward in a straight line end to end relation and with the lower end of the first lower channel member having means engaging the ground;

a stretcher table adapted to be placed to horizontal position and moved upward and downward along the length of the inclined channel members for supporting a stretcher thereon and to move the stretcher thereon upward and downward along the length of the channel members in an inclined straight line, with said stretcher table maintaining its horizontal relation to the ground, while being elevated up in the inclined path along the length of the channels into the doorway;

motorized hydraulic screw means mounted to the lower channel member and motorized with a cable pulley connection providing a mechanical advantage to engage and move said stretcher table upward from the first lower channel member onto and along the second upper channel member into the open doorway of said aircraft between the bar members while the bar members are engaging the side edges of the doorway.

2. An inclined stretcher loading ramp apparatus for loading a stretcher onto an aircraft while the aircraft is located on the ground and wherein the aircraft fuselage has an opening in its side forming a doorway with top and bottom edges and opposing side edges with said open doorway spaced above the ground for receiving a stretcher;

said ramp apparatus comprising a first lower and second upper channel member each having upper and lower ends with said upper end of said first lower channel member pivotally mounted to the lower end of said second upper channel member and adapted to be pivoted to straight line end to end relation for use and foldable about said pivot to substantial parallelism for storage;

a loading frame having a pair of elongated bar members with upper outward projecting pins at their upper ends with the bar members expandable outward to cause the projecting pins to engage the side edges of the doorway;

each of said elongated bar members of the loading frame and said upper channel member of the ramp apparatus having cooperating slots and lugs for slidably mounting the upper channel member of the ramp apparatus to the loading frame between the elongated bar members of the loading frame and with the bars of the loading frame mounted in the doorway, with the upper and lower channels of the ramp apparatus adapted to incline downward in a straight line end to end relation and with the lower end of the first lower channel member having means engaging the ground;

a stretcher table adapted to be moved along the channel members upward along the length of the channel members, while in end to end relation, from the first lower channel member to the second upper channel member to move a stretcher thereon upward and downward along said channel member in an inclined path with means to maintain said stretcher table in substantially horizontal relation while moving along the inclined path;

motorized means on said first lower channel member and motorized with means having a mechanical advantage to extend upward from said first lower channel member to said second upper channel member to engage and move said stretcher table upward from said first lower channel member upward along said second channel member to the upper end of the second upper channel member to the open doorway of said aircraft and between the arms while the arms are mounted to the side edges of the open doorway.

3. An inclined stretcher loading ramp apparatus for loading a stretcher onto an aircraft onto one side of the aircraft while the aircraft is located on the ground and wherein the aircraft has an opening in said one side of the aircraft forming a doorway having top and bottom edges and spaced opposite side edges and with the doorway spaced above the ground;

said ramp apparatus comprising a first lower and second upper channel member each having upper and lower ends with upper end of the first lower channel member pivotally mounted to the lower end of the second upper channel member and adapted to be pivoted to straight line end to end relation for use and pivoted to substantial parallelism for storage;

a loading frame having a pair of elongated bar members with upper outward projecting means at their upper ends with the bar members expandable outward to cause the projecting means to engage the side edges of the doorway;

each of said elongated bar members of the loading frame and said upper channel member of the ramp apparatus having cooperating slots and lugs for slidably mounting the upper channel member of the ramp apparatus to the loading frame between the elongated bar members of the loading frame and with the bars of the loading frame mounted in the doorway, with the upper and lower channels of the ramp apparatus adapted to incline downward in a straight line end to end relation and with the lower end of the first lower channel member having means engaging the ground;

a stretcher table movably mounted for movement upward to the open doorway between the pair of elongated bar members of the loading frame while the bar members are attached to the sides of the doorway and downward along the length of the inclined channel members for supporting a stretcher thereon, means to move said stretcher table outward into substantial horizontal relation and maintain horizontal while moving along the channel members in its inclined path;

motorized means on one of said channel members to move said stretcher table upward from said first lower channel member to the upper end of said second lower channel member at said open doorway of the aircraft with said stretcher thereon and with said stretcher table maintaining said horizontal relation to the ground while being moved upward into the doorway.

\* \* \* \* \*